A. H. TAYLOR.
HAMMER DRILL.
APPLICATION FILED SEPT. 12, 1908.
968,892.
Patented Aug. 30, 1910.
2 SHEETS—SHEET 2.
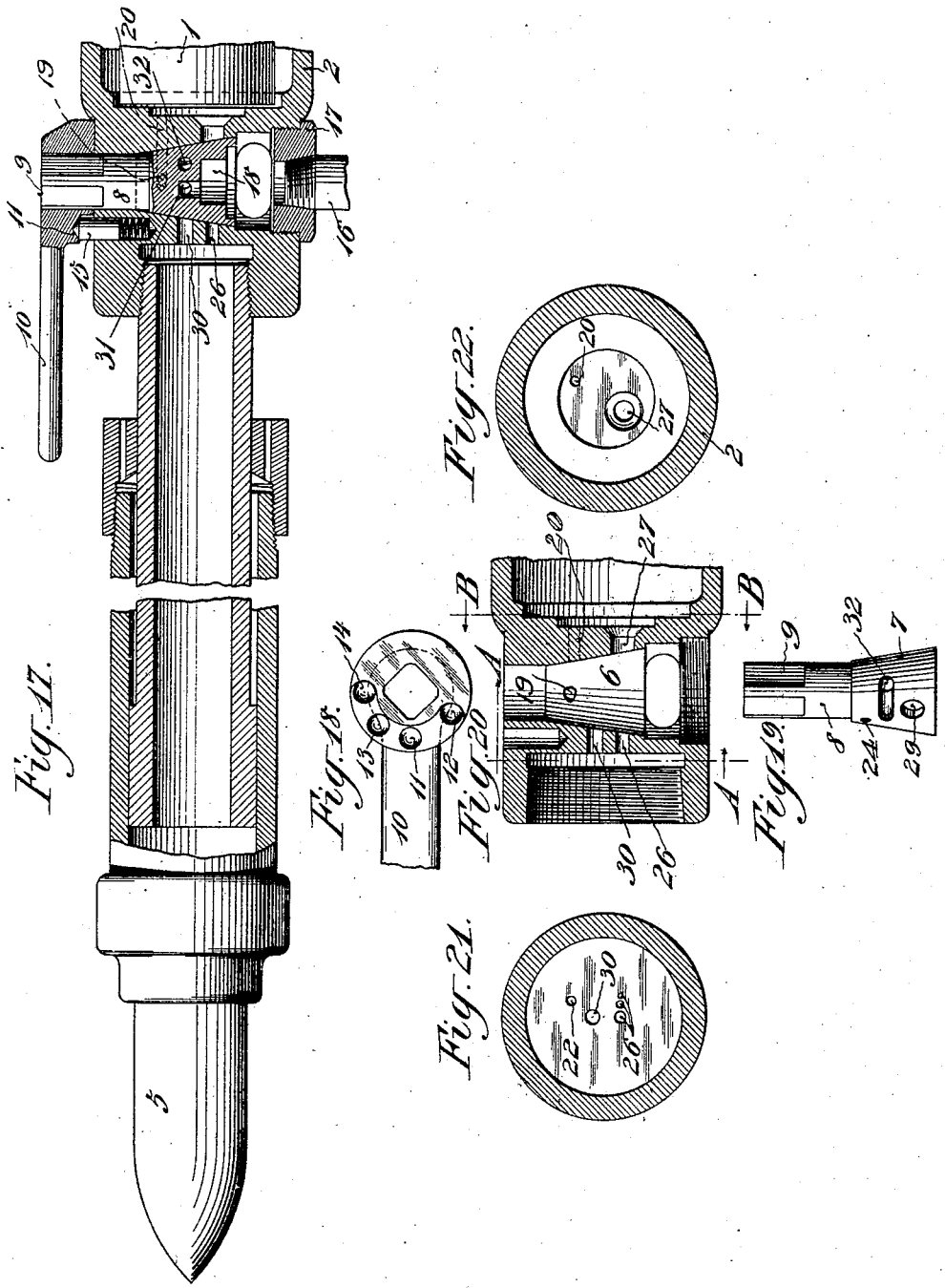

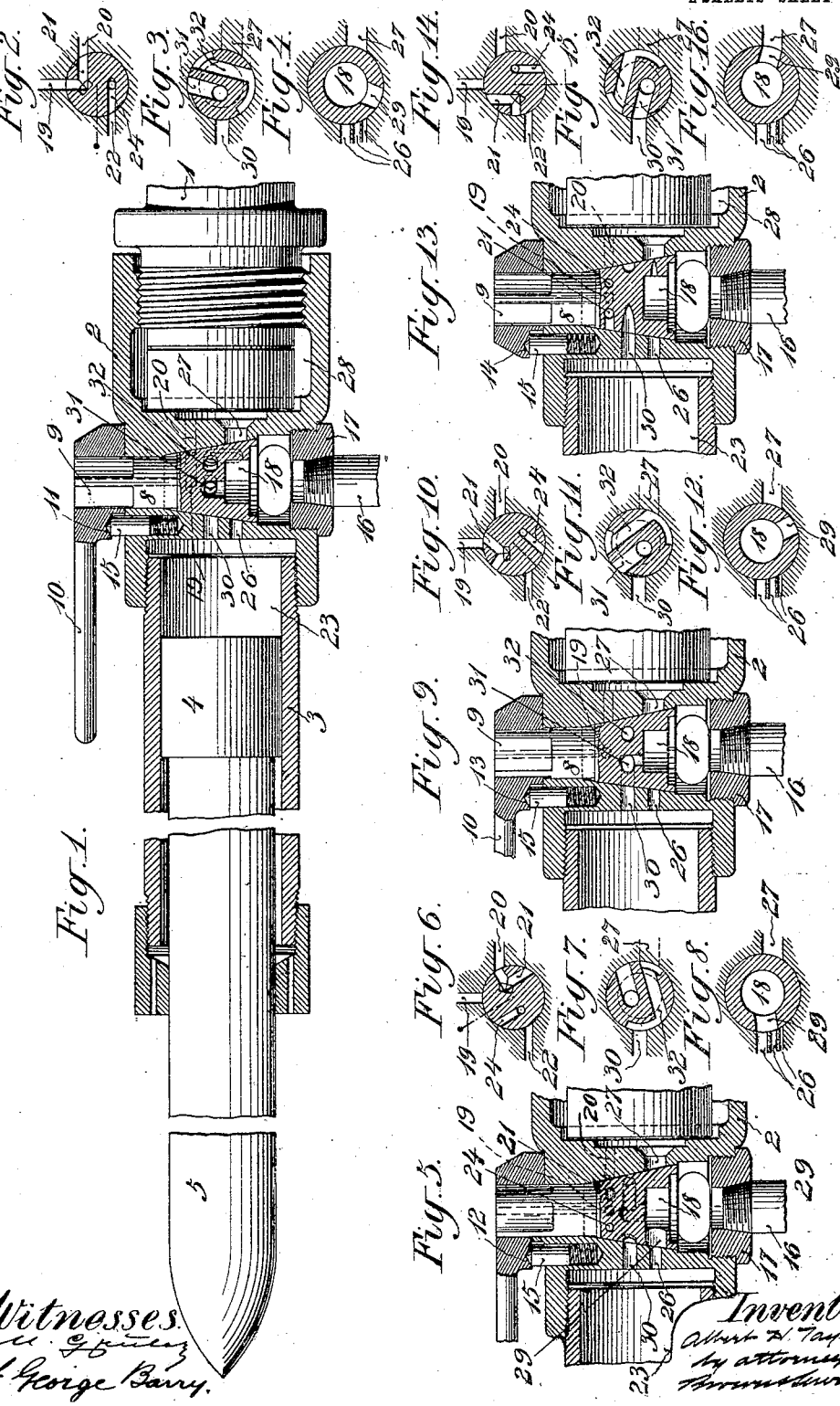

UNITED STATES PATENT OFFICE.

ALBERT H. TAYLOR, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

968,392.

Specification of Letters Patent. Patented Aug. 30, 1910.

Application filed September 12, 1908. Serial No. 452,704.

*To all whom it may concern:*

Be it known that I, ALBERT H. TAYLOR, a citizen of the United States, and resident of Easton, in the county of Northampton and State of Pennsylvania, have invented a new and useful Improvement in Hammer-Drills, of which the following is a specification.

This invention consists in certain improvements in that class of pneumatic tools known as hammer drills in which an air power feed is provided for forcing the tool forward and holding it in its working position; a manually operated controlling device, such, for instance, as a throttle valve, being provided for controlling the admission of air from the supply to the air feed, from the air feed to the hammer, from the air feed to atmosphere and from the supply to the hammer at pleasure for facilitating the operation and control of the hammer.

Practical embodiments of my invention are represented in the accompanying drawings in which, Figure 1 represents a portion of an air feed hammer drill partially in side elevation and partially in longitudinal central section, with my improvements applied thereto, the controlling valve being in position to close communication from the air supply both to the air feed and hammer, the air feed and the hammer both being in open communication with atmosphere through said controlling valve. Figs. 2, 3 and 4 are detail sections showing the location and relation of the several ports when the valve is in the position shown in Fig. 1. Fig. 5 is a detail view partially in side elevation and partially in longitudinal central section, the controlling valve being in position to open the air supply to the air feed and the air feed to the hammer, the communication between the air feed and atmosphere and the hammer and atmosphere through the valve being closed. Figs. 6, 7 and 8 are detail sections showing the location and relation of the several ports when the valve is in the position shown in Fig. 5. Fig. 9 is a view similar to Fig. 5, with the controlling valve shown in position to close communication between the air feed and hammer, between the air supply and air feed and between the air supply and hammer. Figs. 10, 11 and 12 are detail sections showing the location and relation of the ports when the valve is in the position shown in Fig. 9. Fig. 13 is a view similar to Figs. 5 and 9, with the controlling valve in position to close communication between the air feed and hammer and to open communication from the air supply to both the air feed and the hammer. Figs. 14, 15 and 16 are detail sections showing the location and relation of the several ports when the valve is in the position shown in Fig. 4. Fig. 17 is a view similar to Fig. 1, with the exception that the air feed piston is shown attached to the head block instead of the air feed cylinder. Fig. 18 is a partial inverted plan view of the operating handle for the controlling valve. Fig. 19 is a side view of the controlling valve. Fig. 20 is a detail longitudinal central section through the head block. Fig. 21 is a section taken in the plane of the line A—A of Fig. 20, looking in the direction of the arrows, and Fig. 22 is a section taken in the plane of the line B—B of Fig. 20, looking in the direction of the arrows.

The hammer cylinder is denoted by 1 and its head block by 2.

The air feed cylinder is denoted by 3 and its piston by 4. In the form shown in Fig. 1, the air feed cylinder is attached directly to the head block and the air feed piston rod extends rearwardly through the free end of the air feed cylinder so as to form a rear support for the tool. In the form shown in Fig. 17, the air feed piston is attached directly to the head block and the air feed cylinder is provided with a rear extension 5 which forms a rear support for the tool. The head block 2 of the tool is provided with a hole therethrough a portion of which forms a tapered seat 6 for the tapered portion 7 of a controlling valve. The cylindrical portion 8 of the said controlling valve at the end of its tapered portion is provided with an angular portion 9 on which is fixed the valve operating handle 10. This valve operating handle is provided on its inner face, adjacent to the outer face of the head block, with four shallow recesses 11, 12, 13, 14, arranged to respectively receive and retain against unintentional removal, the tapered end of a spring actuated sliding pin 15 mounted in the head block 2. An air supply pipe 16 is secured to the head block 2 by a collar 17 having a screw-threaded engagement with the hole in the head block beyond its tapered seat 6. The controlling valve is provided with a chamber 18 in open communication with the air supply pipe 16.

Ports 19 and 20 in the same transverse plane lead from the tapered valve seat 6, respectively to external atmosphere and to the hammer, which ports are arranged to be brought into communication with each other through a bridge port 21 in the controlling valve when the valve is in one of its rotary positions. A port 22 located in the same plane as the ports 19, 21, leads from the valve seat 6 to the air feed chamber 23 and a port 24 is located in the controlling valve, one branch of which port may be brought into communication with the port 22 when the valve is in one of its rotary positions, the other branch of which port 24 leads to external atmosphere through the end of the said valve. A series of gradually enlarging ports 26 are located in the same transverse plane and lead from different points on the valve seat 6 to the air feed chamber 23. A port 27 in the plane of the ports 26, leads from the valve seat 6 into the hammer chamber 28. A port 29 in the controlling valve is arranged to open communication from the air supply to the air feed through the ports 26, when the valve is in one of its rotary positions, and from the air supply to the hammer through the port 27 when in another of its rotary positions. A port 30 leads from the valve seat 6 to the air feed chamber 23 and a port 31 in the controlling valve is arranged to open communication from the air supply to the air feed through the port 30, when the valve is in one of its rotary positions. Another port 32 in the controlling valve is arranged to open communication directly from the air feed to the hammer through the ports 30 and 27 when the controlling valve is in one of its rotary positions.

In operation, supposing the parts to be in the position shown in Figs. 1, 2, 3 and 4, the air supply will be shut off from both the air feed and the hammer; the air feed chamber 23 being open to atmosphere through the ports 22 and 24, and the hammer chamber 28 being open to atmosphere through the ports 20, 21 and 19, as clearly shown in Fig. 2. When the parts are in this position, the handle will be yieldingly held against unintentional displacement by the engagement of the spring actuated pin 15 with the recess 11 in the inner face of the handle 10. When it is desired to start the tool upon its work, the handle, and thereby the controlling valve, is swung into the position shown in Figs. 5, 6, 7 and 8. The parts will be yieldingly held in this position against unintentional displacement by the engagement of the spring actuated pin 15 with the recess 12. As the valve is moved into this position, the air supply will be gradually opened into the air feed chamber by the successive opening of the graduated ports to the said air supply through the port 29. This same movement of the valve will close communication to atmosphere from the air feed chamber 23 and hammer chamber 28. This same movement of the valve will open communication directly from the air feed chamber 23 to the hammer feed chamber 28 through the ports 30, 32 and 27. Thus the tool will be fed to its work and held there under a lesser pressure than if the air supply were opened directly the air feed chamber and hammer chamber, as the air pressure in the air feed chamber will be somewhat relieved by its escape through the hammer. The next step in the operation is to move the controlling valve into the position shown in Figs. 9, 10, 11 and 12. The valve is yieldingly held in this position against unintentional displacement by the engagement of the spring actuated pin 15 with the recess 13 in the inner face of the handle 10. When the parts are in this position communication to atmosphere through the valve from the air feed chamber 23 and hammer chamber 28, is closed. Also communication from the air feed chamber to the hammer chamber through the ports 30, 32 and 27 is closed; also communication from the air supply to the air feed through the ports 26 and 29 is closed. Communication, however, is established between the air supply and the air feed chamber 23 through the ports 30 and 31, as clearly shown in Fig. 11. This will serve to hold the tool up to its work with full air pressure. The last step in the operation of the tool is to move the parts into the position shown in Figs. 13, 14, 15 and 16. The parts will be yieldingly held against unintentional displacement by the engagement of the spring actuated pin 15 with the recess 14 in the inner face of the handle 10. Communication from the air feed chamber 23 and hammer chamber 28 to atmosphere through the valve is still closed. Open communication is established directly from the air supply to the air feed chamber 23 and from the air supply directly to the hammer chamber 28. This is accomplished by opening the port 31 to the port 30 and the port 29 to the port 27, as clearly shown in Figs. 15 and 16.

It will thus be seen that by the construction, form and arrangement of the several parts as herein shown and described, I am enabled to feed the hammer up to its work and start the operation thereof, under a lesser pressure than the full pressure of the motive fluid. This is very advantageous for the reason that it is not desirable to start the operation of the tool with the full fluid pressure fed to both the air feed chamber and the hammer. After the hammer has been started on its work, the controlling valve may be moved into position to open the pressure fluid directly to both the air feed and the hammer.

While I have shown and described this invention in connection with an air feed hammer drill, it is to be understood that the same may be used in connection with any fluid pressure fed and operated tool without departing from the spirit and scope of my invention.

What I claim is:

1. A pressure fluid tool, fluid pressure feeding means therefor, and a controlling device having ports so arranged that when the device is in one position it closes communication from the pressure fluid supply to the feeding means and the tool and opens communication from the feeding means and tool to atmosphere.

2. A pressure fluid tool, fluid pressure feeding means therefor, and a controlling valve located between the tool and feeding means having ports so arranged that when the valve is in one position it closes communication from the pressure fluid supply to the feeding means and the tool and opens communication from the feeding means and tool to atmosphere.

3. In an air feed hammer drill, a head block, an air supply, an air feeding means comprising a cylinder and its piston, and a manually operated valve in the head block having ports so arranged that when the valve is in one position it closes communication from the air supply to the feeding means and the hammer and opens communication from the feeding means and hammer to atmosphere.

4. A pressure fluid tool, fluid pressure feeding means therefor, and a controlling device having ports so arranged that when the device is in one position it opens communication from the pressure fluid supply to the tool through the feeding means and closes direct communication between the pressure fluid supply and the tool; and when in another position it opens direct communication from the pressure fluid supply to the feeding means and to the tool.

5. A pressure fluid tool, fluid pressure feeding means therefor, and a controlling valve located between the tool and feeding means having ports so arranged that when the valve is in one position it opens communication from the pressure fluid supply to the tool through the feeding means and closes direct communication between the pressure fluid supply and the tool; and when in another position it opens direct communication from the pressure fluid supply to the feeding means and to the tool.

6. In an air feed hammer drill, a head block, an air supply, an air feeding means comprising a cylinder and its piston, and a manually operated valve in the head block having ports so arranged that when the valve is in one position it opens communication from the air supply to the hammer through the feeding means and closes direct communication between the air supply and hammer; and when in another position it opens direct communication from the air supply to the feeding means and to the hammer.

7. A pressure fluid tool, fluid pressure feeding means therefor, and a controlling device having ports so arranged that when the device is in one position it opens communication from the pressure fluid supply to the tool through the feeding means and closes direct communication between the pressure fluid supply and the tool; and when in another position it closes communication between the tool and both the feeding means and pressure fluid supply and opens communication between the pressure fluid supply and the feeding means.

8. A pressure fluid tool, fluid pressure feeding means therefor, and a controlling valve located between the tool and feeding means having ports so arranged that when the valve is in one position it opens communication from the pressure fluid supply to the tool through the feeding means and closes direct communication between the pressure fluid supply and the tool; and when in another position it closes communication between the tool and both the feeding means and pressure fluid supply and opens communication between the pressure fluid supply and the feeding means.

9. In an air feed hammer drill, a head block, an air supply, an air feeding means comprising a cylinder and its piston, and a manually operated valve in the head block having ports so arranged that when the valve is in one position it opens communication from the air supply to the hammer through the feeding means and closes direct communication between the air supply and the hammer; and when in another position it closes communication from the hammer to both the feeding means and the air supply and opens communication from the air supply to the feeding means.

10. A pressure fluid tool, fluid pressure feeding means therefor, and a controlling device having ports so arranged that when the device is in one position it opens communication from the pressure fluid supply to the tool through the feeding means and closes direct communication between the pressure fluid supply and the tool; when in another position it closes communication between the tool and both the feeding means and pressure fluid supply and opens communication from the pressure fluid supply to the feeding means; and when in a third position it opens direct communication from the pressure fluid supply to both the feeding means and the tool.

11. A pressure fluid tool, fluid pressure feeding means therefor, and a controlling valve located between the tool and feeding means having ports so arranged that when the valve is in one position it opens communication from the pressure fluid supply to the tool through the feeding means and closes direct communication between the pressure fluid supply and the tool; when in another position it closes communication between the tool and both the feeding means and pressure fluid supply and opens communication from the pressure fluid supply to the feeding means; and when in a third position it opens direct communication from the pressure fluid supply to both the feeding means and the tool.

12. In an air feed hammer drill, a head block, an air supply, an air feeding means comprising a cylinder and its piston, and a manually operated valve in the head block having ports so arranged that when the valve is in one position it opens communication from the air supply to the hammer through the feeding means and closes direct communication between the air supply and the hammer; when in another position it closes communication between the hammer and both the feeding means and air supply and opens communication from the air supply to the feeding means; and when in a third position it opens direct communication from the air supply to both the feeding means and the hammer.

13. A pressure fluid tool, fluid pressure feeding means therefor, and a controlling device having ports so arranged that when the device is in one position it opens communication from the pressure fluid supply to the tool through the feeding means and closes direct communication between the pressure fluid supply and the tool; when in a second position it closes communication between the tool and both the feeding means and pressure fluid supply and opens communication from the pressure fluid supply to the feeding means; when in a third position it opens direct communication from the pressure fluid supply to the feeding means and the tool; and when in a fourth position it closes communication between the pressure fluid supply, the feeding means and the tool and opens communication from the feeding means and the tool to atmosphere.

14. A pressure fluid tool, fluid pressure feeding means therefor, and a controlling valve located between the tool and feeding means having ports so arranged that when the valve is in one position it opens communication from the pressure fluid supply to the tool through the feeding means and closes direct communication between the pressure fluid supply and the tool; when in a second position it closes communication between the tool and both the feeding means and pressure fluid supply and opens communication from the pressure fluid supply to the feeding means; when in a third position it opens direct communication from the pressure fluid supply to the feeding means and the tool; and when in a fourth position it closes communication between the pressure fluid supply, the feeding means and the tool and opens communication from the feeding means and the tool to atmosphere.

15. In an air feed hammer drill, a head block, an air supply, an air feeding means comprising a cylinder and its piston, and a manually operated valve in the head block having ports so arranged that when the valve is in one position it opens communication from the air supply to the hammer through the feeding means and closes direct communication between the air supply and the hammer; when in a second position it closes communication from the hammer to both the feeding means and the air supply and opens communication from the air supply to the feeding means; when in a third position it opens direct communication from the air supply to both the feeding means and the hammer; and when in a fourth position it closes communication between the hammer, the feeding means and the air supply and opens communication from the hammer and feeding means to atmosphere.

In testimony, that I claim the foregoing as my invention, I have signed my name in presence of two witnesses, this twenty-first day of August 1908.

ALBERT H. TAYLOR.

Witnesses:
F. GEORGE BARRY,
HENRY THIEME.